(12) United States Patent
Essati et al.

(10) Patent No.: US 9,417,071 B2
(45) Date of Patent: Aug. 16, 2016

(54) METHOD AND SYSTEM FOR SENSING THE POSITION OF A VEHICLE

(75) Inventors: Alec Essati, Vienna (AT); Horst Wildenauer, Vienna (AT)

(73) Assignee: ZENO TRACK GMBH, Vienna (AT)

(*) Notice: Subject to any disclaimer, the term of this patent is extended or adjusted under 35 U.S.C. 154(b) by 853 days.

(21) Appl. No.: 13/521,295

(22) PCT Filed: Jan. 18, 2011

(86) PCT No.: PCT/AT2011/000030
§ 371 (c)(1),
(2), (4) Date: Jul. 10, 2012

(87) PCT Pub. No.: WO2011/085426
PCT Pub. Date: Jul. 21, 2011

(65) Prior Publication Data
US 2012/0287280 A1   Nov. 15, 2012

(30) Foreign Application Priority Data
Jan. 18, 2010  (AT) ........................................ 60/2010

(51) Int. Cl.
*H04N 7/18*   (2006.01)
*G01C 21/00*  (2006.01)
*G05D 1/02*   (2006.01)

(52) U.S. Cl.
CPC ............ *G01C 21/005* (2013.01); *G05D 1/0274* (2013.01)

(58) Field of Classification Search
CPC .............. G05D 2201/0202; G05D 2201/0206; G05D 2201/0207; G05D 2201/0216
See application file for complete search history.

(56) References Cited

U.S. PATENT DOCUMENTS

| | | | | |
|---|---|---|---|---|
| 2003/0123703 A1* | 7/2003 | Pavlidis | ............. | G06K 9/00335 382/103 |
| 2007/0193798 A1* | 8/2007 | Allard | ..................... | H04L 67/12 180/169 |
| 2008/0007619 A1* | 1/2008 | Shima | ................... | G06T 7/0018 348/118 |
| 2008/0177640 A1* | 7/2008 | Gokturk | ................. | G06Q 30/02 705/26.62 |
| 2009/0198371 A1* | 8/2009 | Emanuel | ............... | B66F 9/0755 700/226 |

FOREIGN PATENT DOCUMENTS

DE   102007021693 A1   11/2008
WO   WO03096052 A2     11/2003

OTHER PUBLICATIONS

PCT/AT2011/000030 International Preliminary Report on Patentability English Translation.
PCT/AT2011/000030 Written Opinion dated Apr. 11, 2011.
Austrian Patent Application No. A 60/2010 Office Action dated Oct. 22, 2010.

* cited by examiner

*Primary Examiner* — Sath V Perungavoor
*Assistant Examiner* — Dakshesh Parikh

(57) ABSTRACT

The invention concerns a method and a system for purposes of registering the position of a vehicle (1) in a defined region (3), wherein a digital map of the defined region (3) is created, having a defined coordinates system, wherein the digital map includes stationary reference features (T1) with a unique identifying feature, before digital images are recorded of at least a sub-region of the defined region (3), preferably of the whole defined region (3), for purposes of registering and detecting further reference features (T1, T2, T3), wherein stationary and/or temporary reference features (T2, T3) without unique identifying features are also registered and detected, and are added to the digital map and/or an associated buffer store, so that the absolute position of the vehicle (1) in the defined region (3) can subsequently be determined, in that a digital image of a portion of the defined region (3) is recorded by the vehicle (1), and in the digital image reference features (T1, T2, T3) are detected and optionally identified, wherein the determination of absolute position is undertaken on the basis of the stationary and/or temporary reference features (T1, T2, T3) that have been detected and optionally identified.

18 Claims, 8 Drawing Sheets

METHOD AND SYSTEM FOR SENSING THE POSITION OF A VEHICLE

PRIORITY INFORMATION

This application is a national phase application of PCT/AT 2011/000030, filed Jan. 18, 2011, which claims priority to Austrian Patent Application No. A 60/2010 filed Jan. 18, 2010, the disclosures of which are incorporated herein by reference in their entirety.

FIELD OF THE INVENTION

The invention concerns a method and a system for purposes of registering the position of a vehicle in a defined region.

BACKGROUND OF THE INVENTION

The registering of the current position of a vehicle in a defined region is of great importance in a very wide range of applications. For example the determination of the positions of industrial goods-handling vehicles (e.g. forklift trucks) in the field of storage logistics (management of e.g. production stores, distribution stores) is of great importance, since by this means, for example, the optimisation of logistical processes and automatic tracing of batches of goods items is made possible. For this purpose a very wide variety of methods and devices are of known art, wherein in particular it is of known art to register an absolute reference position of the vehicle, and also the relative movement of the vehicle, and thus to determine the current position of the vehicle, with the aid of a dead reckoning navigation system.

From DE 102 34 730 A1 a method for determining the position of a transport vehicle within an effective range is of known art, in which moveable first objects, transported by the transport vehicle, (transport units, pallet cages, beverage crates or similar) and stationary second objects (for example, walls, supporting pillars) are present. The effective range is stored in the form of a digital map, which contains the positions of the objects. The forklift truck has a laser radar (=LADAR), an electronic compass, and a kinematic GPS, connected with an on-board computer, which supply data to the on-board computer. For purposes of determining the position of the forklift truck the LADAR scans a contour of the environment and thereby registers the warehouse goods items located in the immediate environment, whereupon the result of this scan is compared with the digital map stored in a central computer; on the basis of this comparison the on-board computer or the central computer can determine a position of the forklift truck within the effective range. The LADAR also registers the separation distance between the forklift truck and the known objects, in order to generate an image of the forklift truck's environment. From the determined measurements the position of the forklift truck is determined by a comparison with the data of the digital map using trigonometrical calculations and methods. For purposes of improving the determination of position, data for moveable third objects can also be held in the digital map; these are registered during the scan and are used to update the database. These third objects can be other transport vehicles and/or unknown obstacles.

Disadvantageously the objects called upon for purposes of registering position must have a measurable contour so as to enable a determination of position by way of the laser scanning procedure. Therefore identical objects (e.g. supporting pillars, Euro-pallets, etc) cannot be uniquely identified. Moreover in accordance with DE 102 34 730 A1 it is necessary to determine differences between the scans made by the vehicle and the centrally managed map so as to determine from these the exact position. This means that an exact determination of absolute position is not possible, instead a probable position is determined by way of an exclusion method; while in the best-case scenario this does indeed correspond to the actual absolute position, it can also deviate significantly from the latter. The determination of position by means of laser radar scanning in accordance with known art encounters its limitations in particular if the environment is similar or the distances involved prevent or place limits on the scanning procedure (e.g. in the case of an empty warehouse with supporting pillars, with empty storage areas, or storage areas with stored goods items that have identical structures, or in the external environment).

From US 2009/0198371 A1 a system for goods items tracking is furthermore of known art, with a fixed base system and mobile systems that are linked with vehicles. The mobile system has an identification sensor for purposes of registering objects with coding. The monitored space is also fitted with position markers that are individually different; these are arranged in the ceiling region. The vehicle has an optical position sensor device with a camera that is upwards directed; this records images of the environment so as to register position markers present in the visual field and to establish their identities. The positions of the position markers in the recorded image are used to register the position and the angular orientation of the vehicle. When a position marker is registered the database in the memory of a mobile computer system on the vehicle is also updated. However, this system has the disadvantage that no determination of position is possible if there is no marker in the field of view of the camera, i.e. no other system is available to execute a determination of position. Accordingly a marker must be in the field of view at all locations where a position is required. In storage depots, however, a registration of position is required at all locations and at all times, in order to track even goods items that are set down in unscheduled storage areas. This in turn means that the storage depot must be fitted with very many markers; this leads to an extremely high level of expenditure, particularly in the case of large storage depots. Moreover, by virtue of the attachment of markers to the ceiling, this system of known art is disadvantageously limited to an internal environment.

From DE 44 29 016 A1 a navigation system for driverless vehicles, in particular for transport systems in workshops, is of known art, in which high-contrast objects in the environment, in particular ceiling lights, are recorded by means of an imaging sensor that moves with the vehicle. From the location of these ceiling lights the position and angle of orientation of the vehicle are then determined. Through the use of the high-contrast ceiling lights for the registration of an absolute reference position the costs of the navigation system are to be kept low.

Apart from the fact that is in actual fact not possible to differentiate between ceiling lights that are usually of identical design by way of an optical sensor, e.g. using a CCD camera or photodiode array, or at best only with a high error rate, a trailing wheel is provided for purposes of registering the relative movement of the driverless vehicle; this is connected with the vehicle via a vertical axis about which it can rotate. From the angle of rotation of the wheel about its own axis, and from the angle of rotation of the horizontal movement about the vertical axis, the position of the vehicle is to be determined by way of dead reckoning navigation. In practice, however, such trailing wheels have proved to be extremely inaccurate (in particular as a result of problems with slip and drift).

From WO 01/13192 A1 a method and a device for purposes of registering the position of a vehicle are furthermore of known art, in which reflecting markers must have been previously fitted on the ceiling of a warehouse; these can be registered by the vehicle as it drives underneath a marker, so that by this means a reference position can be registered and stored at this point in time. Moreover in accordance with the WO document a wheel encoder is provided, which at intervals of time registers the distance covered by the vehicle; furthermore the angle of rotation of the vehicle is registered by means of a gyroscope. The current position of the vehicle can then be determined by means of dead reckoning navigation from the reference position and the relative distance covered, determined by means of vector addition. What is particularly disadvantageous here is the fact that the installation of the reflecting markers in the ceiling region of a warehouse is very labour and cost intensive, and moreover the registration of the reference position is not always reliably guaranteed. Furthermore problems arise in the measurement of the relative movement by means of the wheel encoder and gyroscope in terms of slip and drift of the vehicle (e.g. spinning of the wheels), so that often the relative distance covered is incorrectly determined. An application of this method in an external environment (with no roof) of a storage depot is impossible, or only if linked with substantial installation and cost expenditures.

In order to eliminate these disadvantages in the registration of relative movement it is proposed in EP 1 916 504 A2 to register digital image data of a reference surface area of sequential discrete frames, then to subdivide the first of two sequential frames into a plurality of macro-blocks, so as to determine these macro-blocks subsequently in the second frame, wherein the relative movement of the vehicle can be determined as a function of the movement vectors of the positions of the macro blocks. By this means the measurement inaccuracies, which occur during the determination of the relative movement by means of a wheel encoder and a gyroscope, can indeed be eliminated. As a result of the fact that the camera must be attached near the floor, contamination of the camera optics occurs to a large extent; this can lead to a high level of inaccuracy, or a failure, in the registration of the relative movement. However, what is particularly disadvantageous, even in the case of EP 1 916 504, is the fact that, now as before, for purposes of registering the absolute reference position a very laborious and cost intensive installation of reflecting markers in the ceiling region is required.

A similar method and a similar device for purposes of registering a reference position of a vehicle in a warehouse is furthermore of known art from US 2007/10143006 A1. Here a multiplicity of transponders are fitted to the floor of the warehouse, with the help of which a reference position of the vehicle is then to be determined. Here too this takes the form of a technically complex system with a multiplicity of sensors, which, in particular in cases where large surface areas are to be defined, are the cause of extremely high installation and investment expenditures. However, what is particularly disadvantageous is the fact that the registration of a reference position of a vehicle is only possible if it drives over a transponder, and thus there is no continuous registration of a reference position of a vehicle; this has a particularly disadvantageous consequence when e.g. setting down goods items in areas of the storage depot that are not fitted with transponders.

In DE 103 46 596 A1 is likewise proposed the registration of an absolute reference position with the aid of measurement strips that have previously been laid down. Furthermore with the aid of an incremental position registration device a relative determination of position is undertaken by the vectorial summation of incremental movement vectors, wherein a parameter is determined for purposes of displaying the quality of the absolute position registered. As a function of the quality of this parameter the position of the vehicle in the prescribed region is outputted either in absolute mode or in incremental mode, i.e. disadvantageously the absolute and relative measured data are not merged together; instead the measurement of poorer quality is totally rejected.

From US 2007/0150111 A1 an omni-directional robot is also of known art, which on its underneath side has a so-called "optical flow" sensor, with which the relative movement of the robot is registered. Here, however there is no provision for the registration of a reference position in a predefined region.

SUMMARY OF THE INVENTION

The objective of the present invention is accordingly to create a method and a system of the type instanced in the introduction, wherein the installation and investment expenditures for purposes of registering the position of a vehicle are to be kept low, at the same time however an accurate and robust determination of position is guaranteed without the disadvantageous registration of a pure relative movement of the vehicle, wherein the method and system are to be such that they can be deployed both in an interior region and also in an exterior region.

DETAILED DESCRIPTION OF THE INVENTION

In accordance with the invention this is achieved with a method in which a digital map of the defined region, having a defined coordinates system, is created, wherein the digital map includes stationary reference features with a unique identifying feature, before digital images are recorded of at least a sub-region of the defined region, preferably of the whole defined region, for purposes of registering and detecting further reference features, wherein also stationary and/or temporary reference features without a unique identifying feature are registered and detected, and are added to the digital map and/or an associated buffer store, so that the absolute position of a vehicle in a defined region can subsequently be determined, in that a digital image of a portion of the defined region is recorded by the vehicle, and in the digital image reference features are detected and optionally identified, wherein the determination of absolute position is undertaken on the basis of the stationary and/or temporary reference features that have been detected and optionally identified.

The inventive method thus has two stages in time. In a first step of the method reference features are firstly detected in the defined environment and the positions of these reference features are registered on the basis of reference features already known before the start of the method, and their coordinates are stored in the digital map and/or a buffer store. In a second stage of the method the absolute position of the vehicle, i.e. the coordinates pair x, y, that is to say, the orientation of the vehicle in the defined environment is then determined in each case on the basis of the stationary reference features and any temporary reference features. Thus with the aid of the stationary and temporary reference features a determination of relative position, i.e. a pure alteration of position, is not required and a determination of position based on absolute, i.e. global, coordinate values can advantageously be executed continuously. By virtue of the automatic calibration and measurement of reference features complex geodetic measurements can be avoided, and moreover it is advantageously possible to adapt the digital map of the defined region in a simple manner in the event of any alterations or expansions of the defined region (e.g. alterations to the storage areas, expansion of the storage depot floor area, etc.).

With respect to the types of reference features three types can in particular hereby be differentiated.

Type 1: Stationary reference features of a fixed design, with a unique identifying feature, and of variable size.

These possess e.g. a rectangular shape (4 corner points) and can consist of a black edge, a white surface area, and black symbols (letters, numbers, or other symbols). The symbol combination represents a unique identifying feature.

Examples are markings or signage located on the floor, on walls, or posts (e.g. storage area markings or storage depot corridor markings). The size of these objects can vary depending upon the environmental circumstances. Markings in storage areas can be e.g. 40×30 cm in size, markings on storage depot gangways are somewhat larger at e.g. 80×60 cm, and signage on walls or posts can even be e.g. 200×150 cm in size.

Type 2: Stationary reference features of a fixed design, with no unique identifying feature, and of variable size.

These reference features can be any stationary high-contrast objects in the defined environment (e.g. fire extinguishers, shelving, posts, etc.). A further example would be a right angle, which is formed by two lines of marking on the floor, which are located at approx. 90 degrees to one another. These reference features possess no unique identifying features of their own (e.g. in the form of a combination of symbols).

Type 3: Stationary reference features of no fixed design, with no unique identifying features and of variable size.

These reference features are all high-contrast features of any size and shape (e.g. edges of goods items or labels, contamination on the floor, vehicles, etc.), which are for the most part only located at one stationary location for a certain period of time. These possess no unique identifying features of their own (e.g. in the form of a combination of symbols).

The digital map of the defined region, i.e. of the defined environment (e.g. storage depot), possesses a defined (global) coordinates system, includes the reference features and their properties (e.g. coordinates, identifying features, etc.) and can be used for purposes of electronic data processing.

In addition the digital map of the warehouse can include further specific properties of the defined environment (e.g. global coordinates and dimensions of storage places, etc.).

At the same time as determining the position of the vehicle, so as to enable also continuous tracking of any goods items stored in the defined region, it is of advantage if, when setting down goods items having an identifying feature in the defined region, the coordinates of the goods items, preferably the corner points of the goods items, are added to the buffer store. Since the goods items that can be uniquely identified by means of the identifying feature, i.e. in particular a bar code and/or plain script, e.g. EAN 128, whose coordinates are known, can similarly be called upon for purposes of absolute determination of position of the vehicle, and thus determination of position can be made even more robust and accurate, particularly at those points where a high level of accuracy is required, it is beneficial if, when detecting an identifying features of an goods item, and at least one corner point of the goods item by means of the coordinates held in the buffer store, an absolute determination of position of the vehicle is undertaken. In addition a plausibility check of the position can be executed utilising information concerning the goods items.

In the interests of a particularly robust system it is accordingly of advantage if the information from a plurality of absolute determinations of position is used, i.e. in particular from those determined as a function of the stationary reference features, and those taking account of temporary reference features, and/or determinations of position on the basis of information concerning the goods items. Accordingly it is advantagenus if a determination of absolute position is undertaken by means of tracking of stationary reference features, and a determination of absolute position is undertaken by means of tracking of temporary reference features and/or the identification of a goods item, and the absolute position of the vehicle is achieved by way of a fusion of the coordinates determined by means of the determinations of absolute position. In this regard it should be noted that state measurements in principle are always prone to errors, i.e. in general the measurements do not reproduce the true state exactly and completely correctly. On the basis of the measurements it is, however, possible to estimate or approximate to the exact state. By the fusion of the estimated coordinates from a plurality of determinations of absolute position, by way of a stochastic method of state estimation in a dynamic process based on a filter system, e.g. particle filters of known art, a comprehensive set of rules for the prior knowledge can thus be stored. With the collection of a large number of samples (particles) the determination of position thus approximates to the actual exact value.

With respect to a determination of position on the basis of a so-called marker tracking it is of advantage if, after recording a digital image for purposes of determining position, at least one detail from the image, in which at least one stationary reference feature is located, is selected and stored, and, for purposes of absolute determination of position of the vehicle, the detail is projected by means of transformation onto a subsequently recorded digital image.

In addition, and independently of the tracking of stationary reference features, it is beneficial if for this purpose a further absolute determination of position is undertaken at the same time by means of three-dimensional features, wherein it is here advantageous if each reference feature identified in a recorded digital image, which is not stored in the digital map, is preferably buffer stored, and the buffer stored reference feature is used for purposes of determining absolute position, provided that the buffer stored reference feature is identified in a subsequently recorded digital image.

For the further improvement of the accuracy of the determination of position, i.e. of the robustness of the method for purposes of determining position, it is beneficial if, when determining the absolute position, sub-regions of the defined region that cannot be navigated/driven through, or reached, and/or maximum possible alterations in position within a time period, are taken into account on the basis of performance data for the vehicle in combination with a movement history. Here in particular it can be taken into account that e.g. posts, walls, doors, shelves, goods items, etc. cannot be navigated or driven through by the vehicle whose position is to be determined. Similarly sub-regions can be excluded that the vehicle cannot navigate or reach by virtue e.g. of its geometry (length, width, height). In addition a maximum possible alteration in position can be taken into account as a function of maximum speed, minimum turning circle, maximum acceleration/retardation etc., in combination with the path previously covered, speed, acceleration and rotation.

The system of the type instanced in the introduction is characterised in that a memory is provided for purposes of storing a digital map having a defined coordinates system of the defined region, wherein the digital map includes stationary reference features with unique identifying features, and an imaging sensor device is provided for purposes of registering and detecting further stationary and/or temporary reference features without unique identifying features; these are assigned to the digital map and/or an associated buffer store, wherein the imaging sensor device is provided moreover for purposes of registering a digital image of a portion of the defined region, and for purposes of detecting and optionally identifying the reference features held in the digital image, so that a determination of absolute position of a vehicle provided with the imaging sensor device is undertaken on the basis of the stationary and/or temporary reference features that have been detected and optionally identified.

The advantageous effects that accompany the inventive device have already been described above in the context of the inventive method, so that for purposes of avoiding repetition reference is made to the above statement.

BRIEF DESCRIPTION OF THE DRAWINGS

In what follows the invention is described in more detail with the aid of a preferred example of embodiment represented in the drawing, but it is not to be limited to this example of embodiment. In particular.

EXAMPLES

Figure 1:
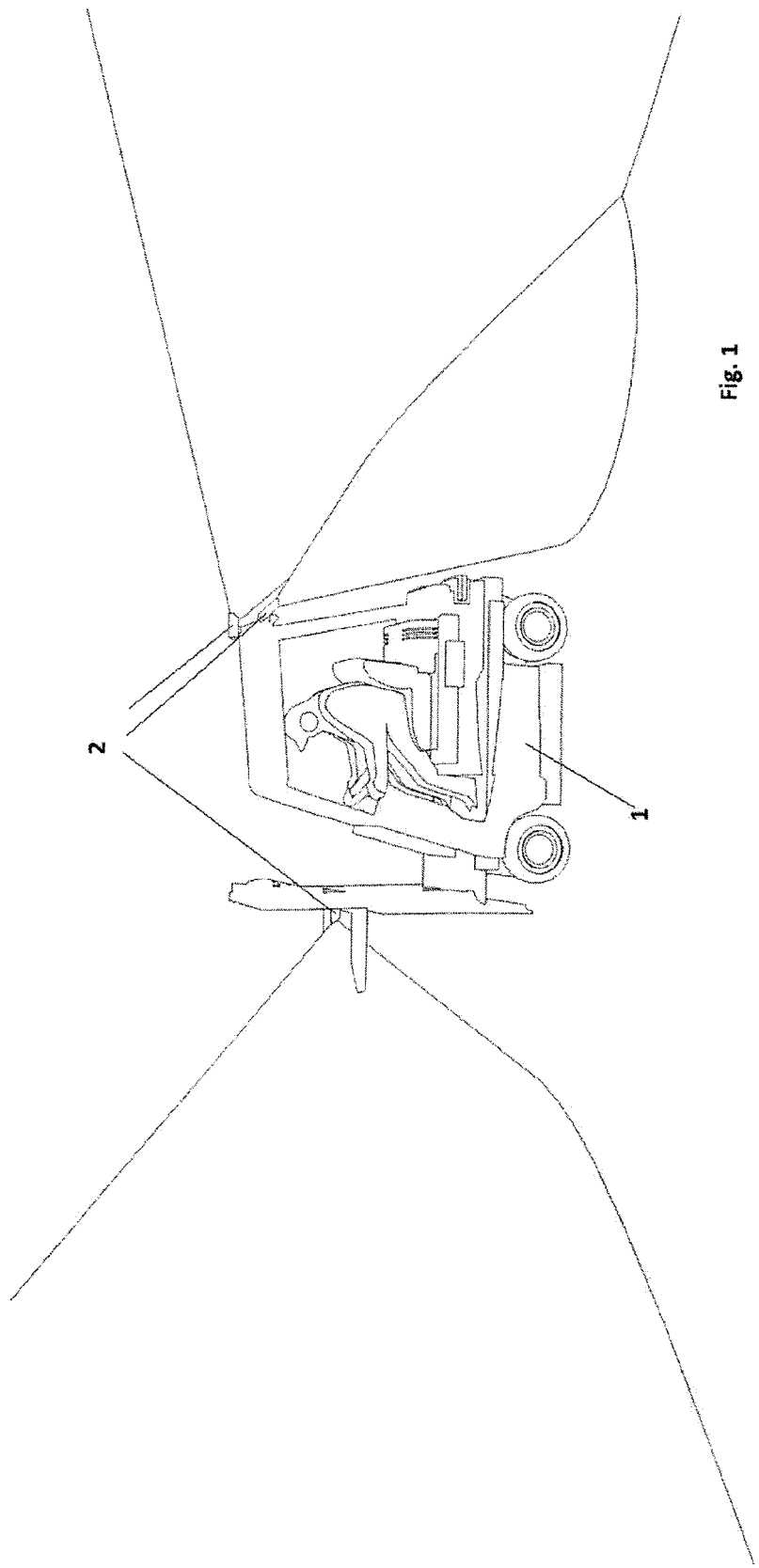
FIG. 1 shows a view in perspective of an industrial goods-handling vehicle with an imaging sensor device.
Figure 2:
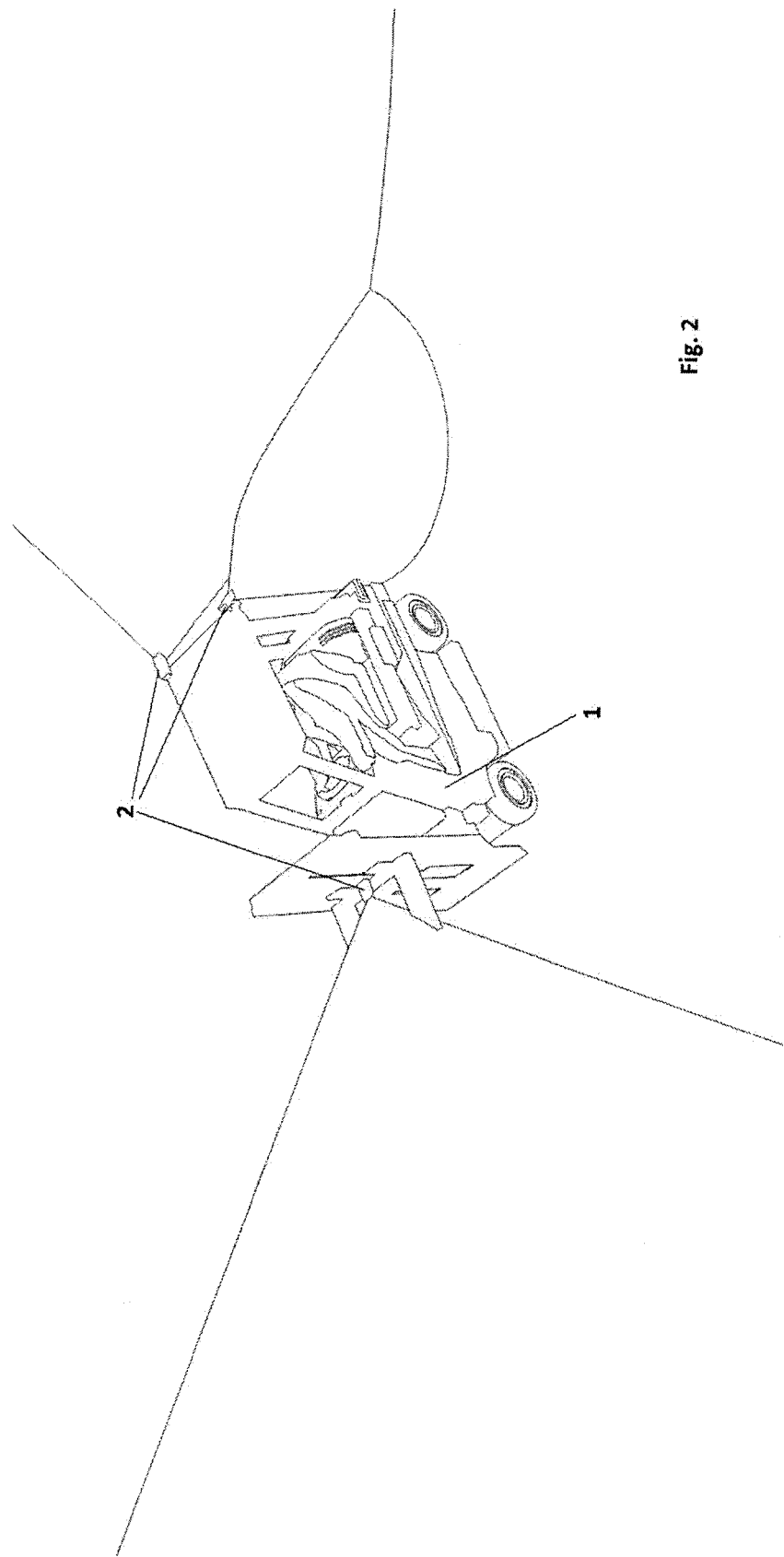
FIG. 2 shows another view in perspective of the industrial goods-handling vehicle in FIG. 1.
Figure 3:
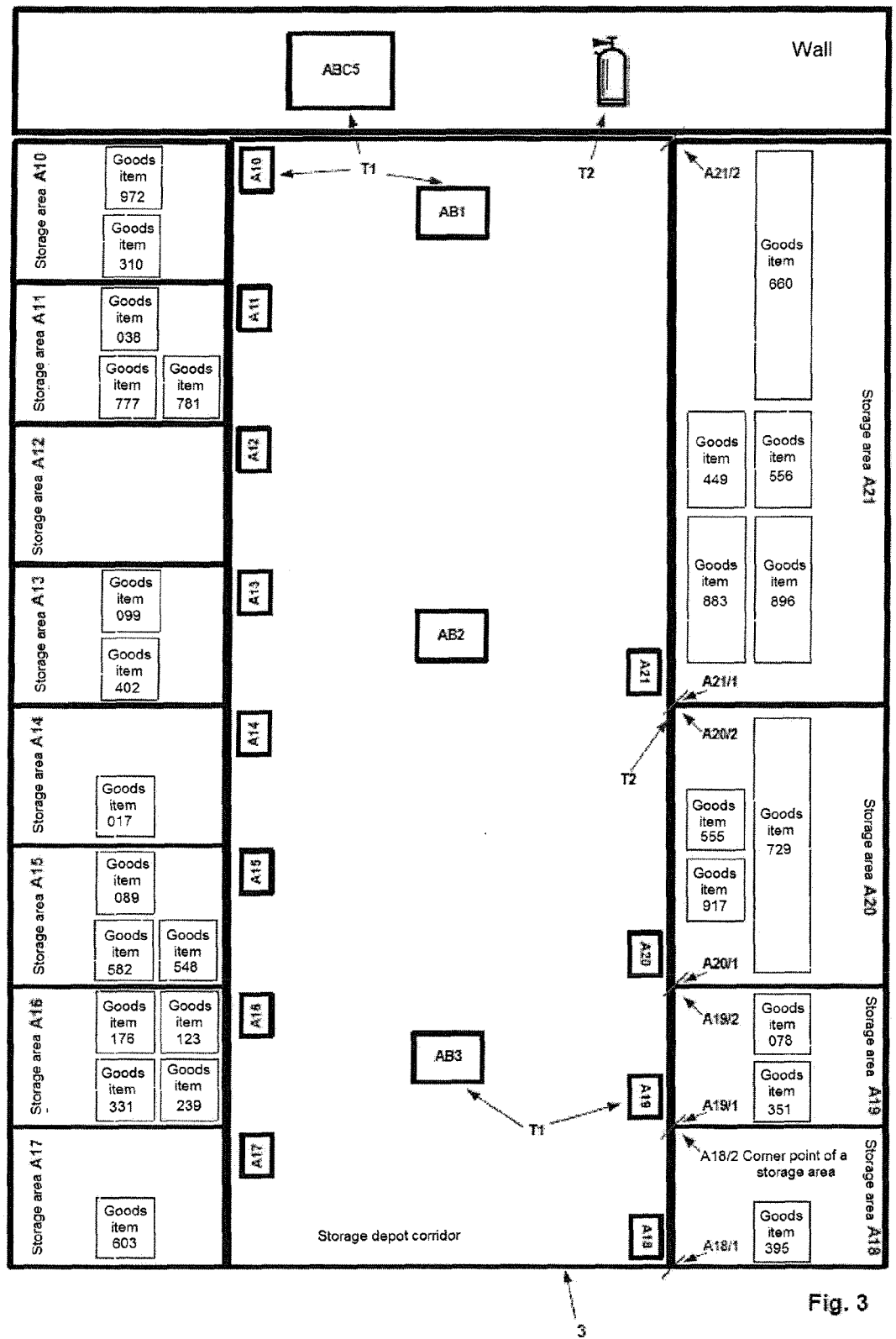
FIG. 3 shows a storage depot having a multiplicity of storage areas with different reference features.

In FIGS. 1 and 2 an example of a vehicle 1 is represented, the position of which is to be determined in a defined region 3 represented in FIG. 3, e.g. a storage depot. Here it can be seen that the vehicle 1 has a plurality of imaging sensor devices, preferably digital cameras 2. The attachment to the vehicle 1 is preferably undertaken such that the field of view registered by the digital camera 2 is directed rearwards of the vehicle 1. This is advantageous, since in the case of industrial goods-handling vehicles the field of view in the direction forwards of the vehicle 1 is often restricted when transporting goods items. When using a plurality of digital cameras 2 they can be attached—as can be seen in FIG. 1—such that the field of view of the cameras 2 is directed in both the rearward and forward directions, wherein, needless to say, the lateral environment of the vehicle 1 is also registered with the cameras 2.

Depending upon the circumstances of the environmental infrastructure (e.g. size of the storage areas, size of the reference markings, size of the labels for goods identification, etc.) the cameras 2 can have, a different resolution and framing rate. The deployment of a digital camera 2 of the Pointgrey Research GRAS-20S4M-C BW Grasshopper type with a resolution of 1624×1224 pixels and a framing rate of up to 30 fps (frames per second) is conceivable.

The digital cameras 2 are equipped for industrial deployment and are linked to a computer (industrial PC) in the interior of the vehicle, either without cables (with a replaceable battery and wireless data transfer), or with cables. Processing of the image data delivered by the digital cameras 2 is undertaken in the computer.

In the schematic view in accordance with FIG. 3 can be seen the defined region 3 designed as a storage space. Here in particular two different types of reference feature, of Type I (T1) and Type 2 (T2), are shown.

Here the T1 reference features are stationary reference features of a fixed design, with a unique identifying feature and variable size.

These possess e.g. a rectangular shape (4 corner points) and can consist of a black edge, a white surface, and black symbols (letters, numbers, or other symbols). The combination of symbols represents a unique identifying feature.

Examples are markings located on the floor, on walls or posts (e.g. storage markings or storage depot corridor markings), or signage. The size of these objects can vary depending upon the environmental conditions. Markings in storage areas can be e.g. 40×30 cm in size, markings on storage depot gangways are somewhat larger at e.g. 80×60 cm, and signage on walls or posts can even be e.g. 200×150 cm in size.

Each of the T2 stationary reference features is of fixed design, with no unique identifying feature, and of variable size. These T2 reference features can be any stationary high-contrast objects in the defined environment (e.g. fire extinguishers, shelving, posts, etc.). A further example would be a right angle, which is formed by two lines of marking on the floor, which are located at approx. 90 degrees to one another (see FIG. 3: A18/2: corner point of a storage area). These T2 reference features possess no unique identifying features of their own (e.g. in the form of a combination of symbols).

T3 stationary reference features are those of no fixed design, with no unique identifying features, and of variable size. These T3 reference features are all high-contrast features of any size and shape (e.g. edges of goods items or labels, contamination on the floor, vehicles, etc.), which are for the most part only located at one stationary location for a certain period of time. These possess no unique identifying features of their own (e.g. in the form of a combination of symbols).

The digital map of the defined region 3, i.e. of the defined environment (e.g. storage depot) possesses a defined (global) coordinates system, includes the reference features T1, T2, T3 and their properties (e.g. coordinates, identifying features, etc.), and can be used for purposes of electronic data processing. In addition the digital map of the storage depot can include further specific properties of the defined environment (e.g. global coordinates and dimensions of storage areas, etc.).

Figure 4:
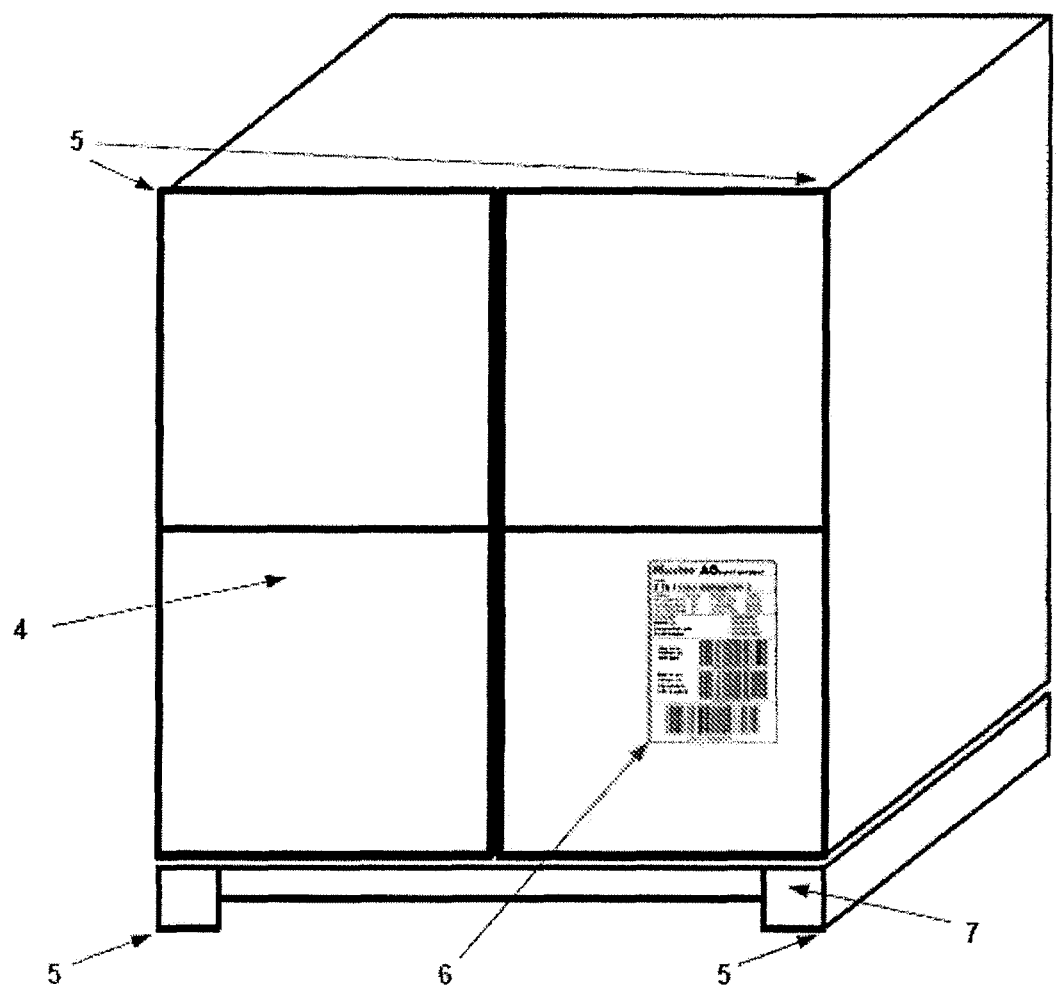
FIG. 4 shows schematically a view in perspective of a goods item located in the storage depot.

In FIG. 4 is shown a schematic example of a goods item 4, wherein in particular the corner points 5 of the goods item 4 are called upon as temporary reference features for purposes of determining an absolute position. In addition the goods item 4 can have a label 6, which in turn can have a unique identifying feature such as, for example, a barcode or a unique identification number executed in plain script, e.g. EAN 128.

Figure 5:
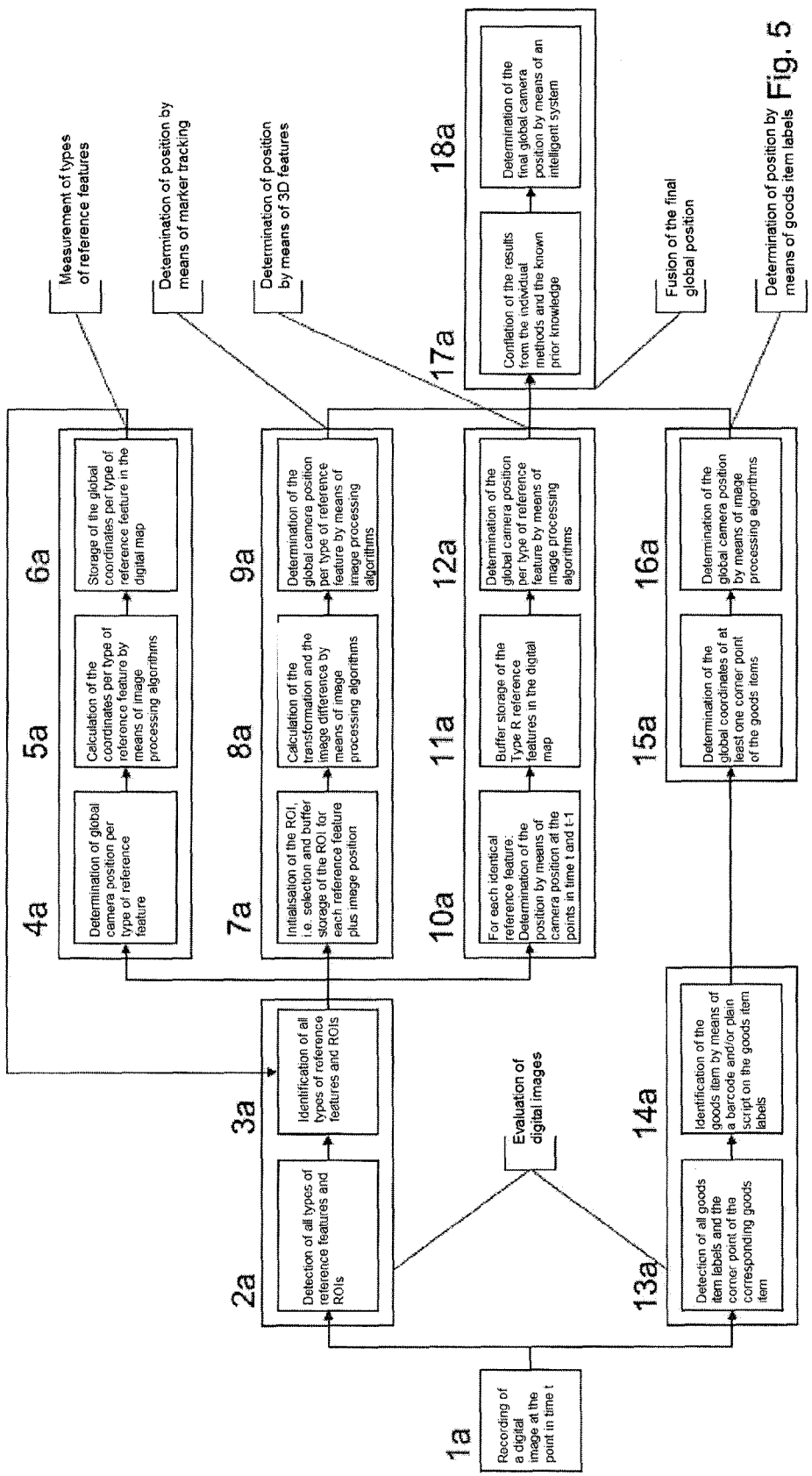
FIG. 5 shows a flow diagram of the two steps of a method for purposes of registering the position of the vehicle.

FIG. 5 shows schematically a flow diagram of a method according to the invention, which comprises a total of 18 steps of the method. Here reference is made to a total of four different types of reference features, which are defined as follows:

A: is a Type 1 reference feature and initially, i.e. before the start of the method, is already stored with its properties (measured coordinates, unique identifying feature) in the digital map.

V: is a Type I or Type 2 reference feature, which is stored by the method with its properties (measured coordinates, unique identifying feature) in the digital map, and initially, i.e. before the start of the method, is not stored in the digital map.

R: is a Type 1, Type 2, or Type 3 reference feature, which is not stored in the digital map.

Z: is a Type 1, Type 2, or Type 3 reference feature, which is temporarily stored in the digital map.

The individual steps of the method 1a-18a can be summarised as follows.

1a—Recording of at least one digital image at a point in time t.

2a—Detection of all reference features of the different types as well as detection of a detail of the digital image in which a reference feature is located (a so-called region of interest—ROI).

3a—Identification of all types of reference features and ROIs.

4a—Determination of the global, i.e. absolute, camera position, and thus the position of the vehicle per reference feature.

5a—Calculation of the coordinates per type of reference feature by means of image processing algorithms of known art.

6a—Storage of the global coordinates per type of reference feature in the digital map. With this the registration and measurement of the types of reference feature is completed and the types of reference feature can be identified in a further step 3a of the method.

7a—Initialisation of the ROI, i.e. selection and temporary storage of the ROI for each reference feature plus image position.

8a—Calculation of the transformation and the image difference by means of image processing algorithms of known art.

9a—Determination of the global camera position per type of reference feature by means of image processing algorithms of known art.

Steps 7a to 9a of the method thus represent a determination of absolute position by means of marker tracking.

10a—For each identical reference feature the position is determined by means of camera position at the point in time t and a previous point in time t-1.

11a—Temporary storage of the Type R reference features in the digital map.

12a—Determination of the global camera position per type of reference feature by means of image processing algorithms of known art.

With steps 10a to 12a of the method a determination of position is thus executed by means of three-dimensional features.

13a—Detection of all goods items, labels and the corner points of the corresponding goods items.

14a—Identification of the goods items by means of barcodes and/or plain script on the labels of the goods items.

15a—Determination of the global coordinates, or at least one corner point, of the goods items.

16a—Determination of the global camera position by means of image processing algorithms.

Steps 15a and 16a of the method thus represent a further determination of absolute position by means of the labels of the goods items.

17a—Conflation of the results from the individual methods for purposes of determining position and from further items of information, i.e. prior knowledge, which in particular can be the following:

Global coordination of regions in the defined environment that cannot be navigated/driven through by the vehicle (e.g. posts, walls, doors, shelving, goods items, etc.).

Maximum possible alteration in position within a period of time on the basis of the performance data of the respectively deployed vehicle (max. speed, min. turning circle, max. acceleration/retardation) in combination with the prior knowledge concerning the movement history (previously covered path, speed, acceleration and rotation).

Regions of the defined environment that cannot be reached by the vehicle, as determined from the geometry of the vehicle (length/width/height)

18a—Determination of the final global camera position by means of state estimations in a dynamic process based on a filter system (e.g. particle filter)

Figure 6:
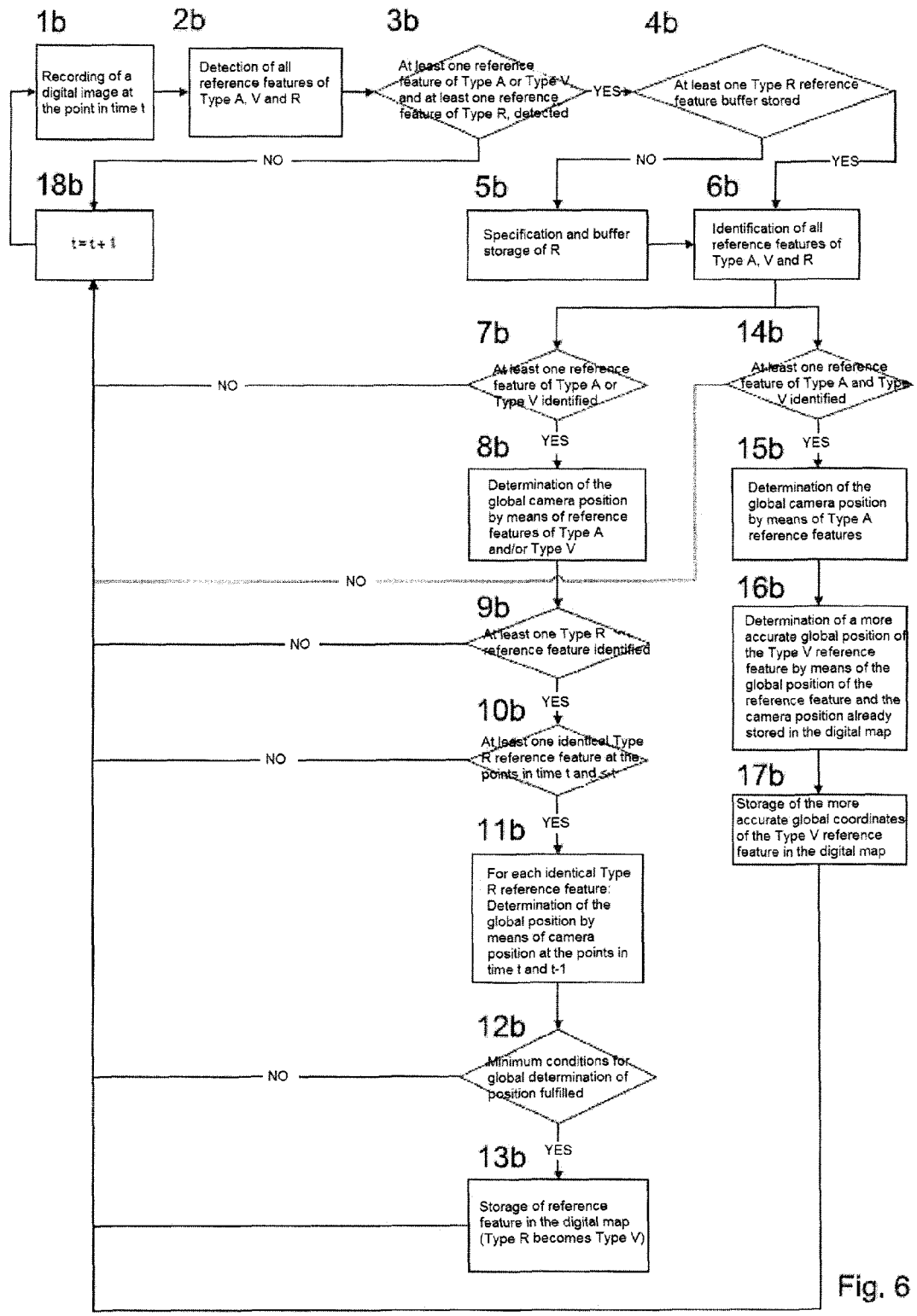
FIG. 6 shows a flow diagram of a stage of the method for purposes of recognising and measuring reference features.

In FIG. 6 can be seen in detail a stage of the method for purposes of recognising and measuring reference features in the defined region 3. With the aid of this stage of the method the digital warehouse map of the defined environment is created in a simple manner that saves effort and cost. This digital map serves as the fundamental database for the described method for purposes of continuous registration of the position of vehicles 1. In the defined environment 3 individual Type A reference features are located at suitable points, i.e. a crossing point, for example, on the storage depot's internal corridor.

The steps of the method can be individually summarised as follows:

1b—Recording of digital images by means of digital cameras installed on a vehicle or vehicles. A vehicle has executed, or a plurality of vehicles have executed, journeys in the defined environment of the form such that all relevant regions of the defined environment are registered by means of digital images.

2b—Detection means the recognition (but not the unique identification) of all reference features of Types A, V and R by means of image processing algorithms.

3b—A calculation of absolute position can in principle only be executed for the case in which at least one reference feature of Type A or V is located in this image, otherwise the subsequent image in time must be analysed.

The determination of the absolute position of this reference feature can only be executed for the case in which at least one reference feature of Type R is located in this image, otherwise the subsequent image in time must be analysed.

4b—The objective of the method, namely the recognition, determination of position and storage in the digital map of hitherto unknown reference features can only be achieved for the case in which at least one reference feature of Type R is located in this image. For purposes of determining position of a Type R reference feature at least two digital images with different angles of view (with a sufficiently large parallax) are necessary (request of buffer storage of the Type R reference feature, i.e. the reference feature has been already recognised in a previous image).

5b—Specification means the determination of the properties (e.g. shape) for all Type R reference features by means of image processing algorithms and their buffer storage.

6b—Identification means the unambiguous recognition of the properties (identifying features) of reference features of Types A, V and R by means of image processing algorithms.

7b—A calculation of absolute position can be only executed for the case in which at least one reference feature of Type A or V is located in this image and this has been unambiguously identified, otherwise the subsequent image in time must be analysed.

8b—Calculation of the global camera position by means of image processing algorithms while taking into account all reference features of Type A or V identified under Item 6.

9b-11b—A calculation of the absolute position of the Type R reference feature and an application of the global camera position calculated under Item 8 can only be executed by means of image processing algorithms for the case in which at least one reference feature of Type R is located in this image, and has been unambiguously identified, and already buffer stored, otherwise the subsequent image in time must be analysed.

12b-13b—The Type R reference feature is only stored in the digital map under the presumption that minimum conditions (e.g. a sufficiently large parallax in the case of two different images with different angles of view) for the absolute position calculated under item 11 have been fulfilled.

14b-17b—Continuously exercised method for the optimisation of the accuracy of the global position of Type V reference features stored in the digital map by means of the application of the algorithms described under items 11-12.

Figure 7:
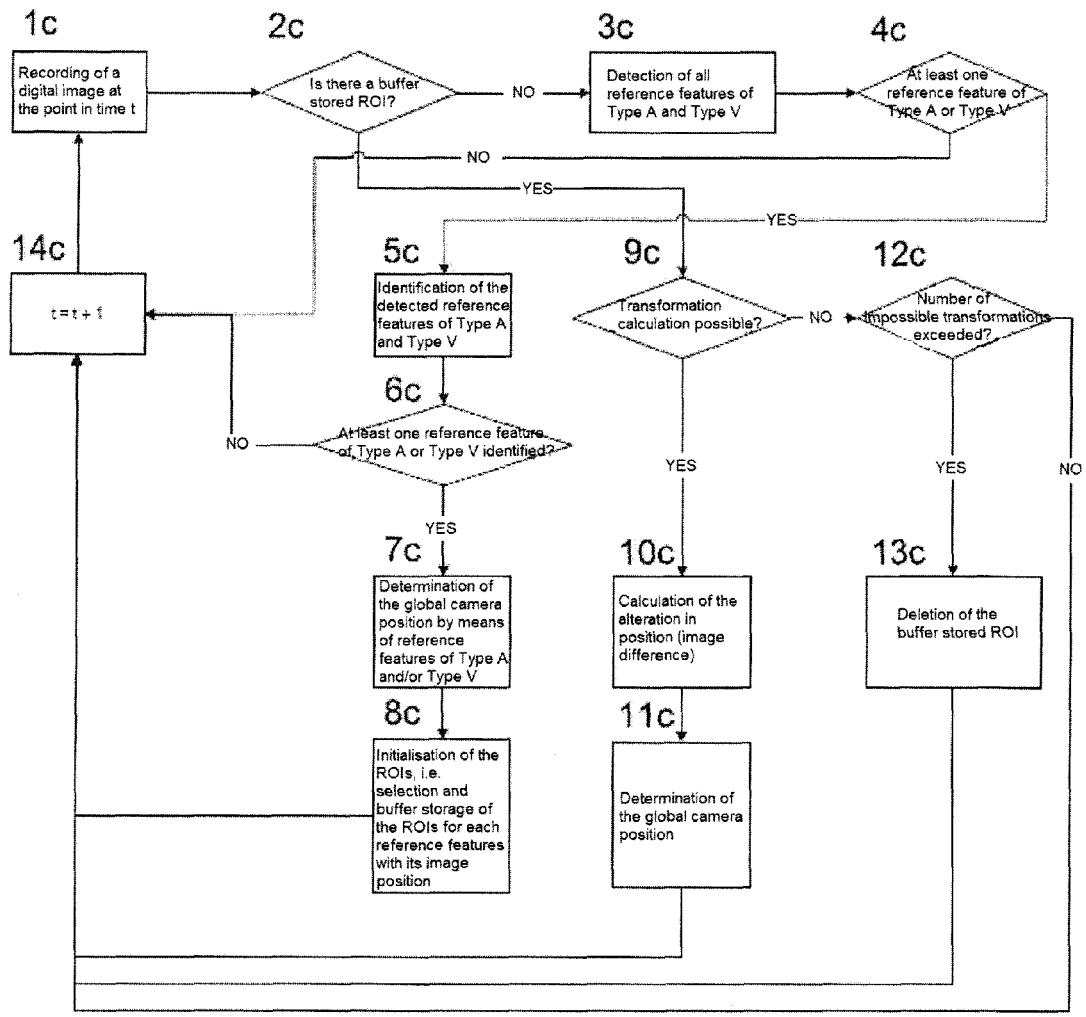
FIG. 7 shows a flow diagram for purposes of determining the absolute position by means of continuous tracking of stationary reference features of fixed design.

FIG. 7 shows in detail a stage of the method for purposes of determining absolute position by means of the continuous tracking of Type 1 and 2 reference features. The ROI (region of interest) hereby represents that detail of the digital image in which the reference feature is located.

The ROI is firstly initialised with the identification of a Type A or Type V reference feature and is only re-initialised at a later point in time if necessary (e.g. too great a distance between the current global position and that camera position at which the ROI is initialised for the first time). During the initialisation the storage of the detail takes place, and the initial transformation of this detail, which is calculated with reference to the respectively current image.

The ROI is projected by means of a transformation (e.g. homography, . . . ) of the image from the previous point in time t-1 onto the image for the subsequent point in time. From the image difference the transformation alteration (and with that the alteration in position) is recalculated by means of optimisation methods.

The steps of the method can be individually described as follows:

1c—Recording of digital images in a defined environment by means of digital cameras installed on a vehicle or vehicles.

2c—Search for buffer stored ROIs, which function as the basis for the transformation calculation.

3c—Detection means the recognition (but not the unique identification) of all reference features of Type A and Type V by means of image processing algorithms.

4c—A calculation of absolute position can in principle only be executed for the case in which at least one reference feature of Type A or Type V is located in this image, otherwise the subsequent image in time must be analysed.

5c—Identification means the unambiguous recognition of the properties (identifying features) of reference features of Type A and Type V by means of image processing algorithms.

6c—For the case in which at least one reference feature of Type A or Type V is located in this image, and this reference feature has been unambiguously identified, a calculation of absolute position can be executed, otherwise the subsequent image in time must be analysed.

7c—Calculation of the global camera position by means of image processing algorithms while taking into account all reference features of Type A or Type V identified under Item 5.

8c—Initialisation of the ROI, i.e. selection and buffer storage of the ROI for each reference feature with its image position.

9c—Transformation calculation, i.e. the search for the relationship between the buffer stored ROI and the reference feature in a subsequent digital image in time.

10c—Calculation of the alteration in position by means of image processing algorithms on the basis of the results from Item 9.

11c—Calculation of the global camera position by means of image processing algorithms while taking into account all alterations of position determined under Item 10.

12c—Check on the number of images downstream of the initialisation of the ROI in which no relationships could be found in accordance with Item 9.

13c—If a defined threshold value in accordance with the check described in Item 12 is exceeded, the buffer stored ROI is deleted.

Advantageously therefore, an identification of the reference feature is only necessary once, and is made possible by means of a determination of position that is significantly more robust and can also be executed at greater distances. In addition such a determination of position is insensitive to contamination in the defined region 3.

Figure 8:
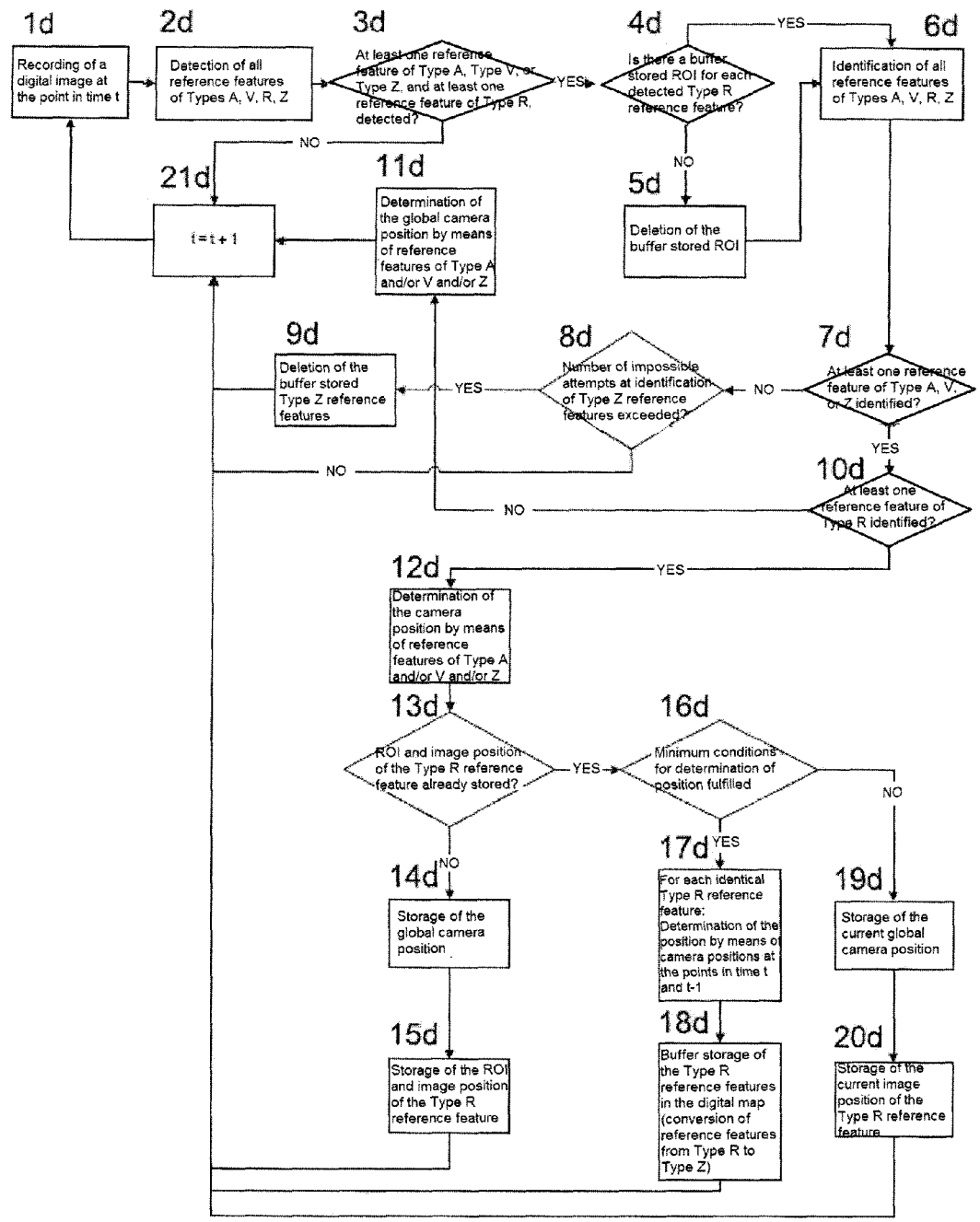
FIG. 8 shows a flow diagram for purposes of determining the absolute position by means of continuous tracking of temporary reference features of no fixed design and without a unique identifying feature.

FIG. 8 represents in detail the determination of absolute position by means of the continuous tracking of Type 3 reference features.

1d—Recording of digital images by means of digital cameras installed on a vehicle or vehicles. A vehicle has executed, or a plurality of vehicles have executed, journeys in the defined environment of the form such that all relevant zones of the defined environment are registered by means of digital images.

2d—Detection means the recognition (but not the unique identification) of all reference features of Types A, V, R and Z by means of image processing algorithms.

3d—A calculation of absolute position can in principle only be executed for the case in which at least one reference feature of Type A, V or Z is located in this image, otherwise the subsequent image in time must be analysed. The determination of the absolute position of this reference feature can only be executed for the case in which at least one reference feature of Type R is located in this image, otherwise the subsequent image in time must be analysed.

4d—The objective of the method, namely the determination of the position of the camera by means of Type R reference features, can only be achieved for the case in which there is a buffer stored ROI for a detected Type R reference feature.

5d—Deletion of all buffer stored ROIs, for which the corresponding Type R reference feature has not been detected.

6d—Identification means the unambiguous recognition of the properties (identifying features) of reference features of Types A, V, Z and R by means of image processing algorithms.

7d—A calculation of absolute position can only be executed for the case in which at least one reference feature of Type A, V or Z is located in this image and this reference feature has been unambiguously identified, otherwise the subsequent image in time must be analysed.

8d-9d—If a defined threshold value in accordance with the identification described in Item 6 is exceeded, the buffer stored Type Z reference feature is deleted.

For 9d see 8d.

10d—A determination of the position by means of the camera positions at the points in time t and t-1 can only be executed for the case in which at least one reference feature of Type R is located in this image and this reference feature has been unambiguously identified, otherwise the subsequent image in time must be analysed.

11d—Calculation of the global camera position by means of image processing algorithms while taking into account all reference features of Type A and/or V and/or Z identified under Item 6, but without an identification of a Type R reference feature.

12d—Calculation of the global camera position by means of image processing algorithms while taking into account all reference features of Type A and/or V and/or Z identified under Item 6, but with an identification of a Type R reference feature.

13d—Search for buffer stored ROIs and image positions of the Type R reference features, which function as the basis for the determination of position by means of image processing algorithms.

14d—Storage of the global camera position.

15d—Storage of the ROI and image position of Type R reference features.

16d—A determination of position using the Type R reference features is only undertaken under the presumption that minimum conditions (e.g. a sufficiently large parallax in the case of two different images with different angles of view) have been fulfilled.

17d—By means of image processing algorithms the global position is calculated by means of camera position (determined under Item 12) at the points in time t and t-1 for each identical Type R reference feature.

18d—The position of the Type R reference feature determined under Item 17d is temporarily stored in the digital map, and the Type R reference feature is thus converted into a Type Z reference feature.

19d-20d—If the minimum conditions described under Item 16d are not fulfilled the storage of the current global camera position and image position of the Type R reference features takes place.

Thus with the aid of such a determination of position no calculation of a pure relative movement (determination of relative position) is required, but instead at each point in time reference can be made back to absolute coordinates, as a result of which the method for purposes of determining position becomes more robust, and at the same time a more accurate and more robust determination of position is achieved compared with methods of known art.

The invention claimed is:

1. A method for registering the position of a vehicle in a defined region, the method comprising:
creating a digital map of the defined region, the digital map having a defined coordinates system and including first stationary reference features with a unique identifying feature;
recording one or more digital images of at least a sub-region of the defined region for purposes of registering and detecting further reference features;
registering and detecting second stationary or temporary reference features without unique identifying features detected in the one or more digital images;
adding the second stationary or temporary reference features without unique identifying features to the digital map or an associated buffer store;
subsequently determining the absolute position of the vehicle in the defined region by recording a subsequent digital image of a portion of the defined region by the vehicle;
detecting and identifying the second stationary or temporary reference features in the subsequent digital image; and
determining the absolute position of the vehicle on the basis of the second stationary or temporary reference features without unique identifying features that have been detected and identified in the subsequent digital image;
wherein when setting down a goods item having an identifying feature in the defined region, or when driving past with the vehicle, the coordinates of the goods item, preferably the corner points of the goods item, are added to the buffer store;
wherein when detecting an identifying feature of a goods item and at least one corner point of the goods item an absolute position of the vehicle is determined by means of the coordinates held in the buffer store;
wherein when determining the absolute position sub-regions of the defined region that cannot be navigated/driven through, or reached, or maximum possible alterations in position within a time period are taken into account on the basis of performance data of the vehicle in combination with a movement history.

2. The method in accordance with claim 1, wherein a determination of absolute position is undertaken by means of tracking of stationary reference features, and a determination of absolute position is undertaken by means of tracking of temporary reference features, or the identification of a goods item, and the absolute position of the vehicle is undertaken by way of a fusion of coordinates determined by means of the determinations of absolute position.

3. The method in accordance with claim 1, wherein after recording a digital image for purposes of determining position at least one detail of the image, in which at least one stationary reference feature is located, is selected and stored, and, for purposes of determining the absolute position of the vehicle, the detail of the image is projected by means of transformation onto a subsequently recorded digital image.

4. The method in accordance with claim 1, wherein each reference feature and that is not stored in the digital map identified in a recorded digital image is preferably buffer stored and the buffer stored reference feature is used for purposes of determining absolute position, provided that the buffer stored reference feature is identified in a subsequently recorded digital image.

5. A system for registering the position of a vehicle in a defined region, the system comprising:
a memory for storing a digital map having a defined coordinates system of the defined region, wherein the digital map includes first stationary reference features with a unique identifying feature detected in one or more digital images; and
an imaging sensor device is provided for purposes of registering and detecting further stationary or temporary reference features without unique identification features, which are assigned to the digital map or an associated buffer store, wherein the imaging sensor device records one or more digital images of a sub-region of the defined region, detects second stationary or temporary reference features in the one or more digital images, registers a subsequent digital image of a portion of the defined region, and detects and identifies the second stationary or temporary reference features held in the subsequent digital image, so that a determination of absolute position of a vehicle provided with the imaging sensor device can be determined based on the second stationary or temporary reference features without unique identifying features detected and identified in the subsequent digital image;

wherein when setting down a goods item having an identifying feature in the defined region, or when driving past with the vehicle, the coordinates of the goods item, preferably the corner points of the goods item, are added to the buffer store;

wherein when detecting an identifying feature of a goods item and at least one corner point of the goods item an absolute position of the vehicle is determined by means of the coordinates held in the buffer store;

wherein when determining the absolute position sub-regions of the defined region that cannot be navigated/driven through, or reached, or maximum possible alterations in position within a time period are taken into account on the basis of performance data of the vehicle in combination with a movement history.

6. The system in accordance with claim 5, wherein at least one digital camera is provided as an imaging sensor device.

7. The method in accordance with claim 1, detail of the image, in which at least one stationary reference feature is located, is selected and stored, and, for purposes of determining the absolute position of the vehicle, the detail of the image is projected by means of transformation onto a subsequently recorded digital image.

8. The method in accordance with claim 1, wherein after recording a digital image for purposes of determining position at least one detail of the image, in which at least one stationary reference feature is located, is selected and stored, and, for purposes of determining the absolute position of the vehicle, the detail of the image is projected by means of transformation onto a subsequently recorded digital image.

9. The method in accordance with claim 2, wherein after recording a digital image for purposes of determining position at least one detail of the image, in which at least one stationary reference feature is located, is selected and stored, and, for purposes of determining the absolute position of the vehicle, the detail of the image is projected by means of transformation onto a subsequently recorded digital image.

10. The method in accordance with claim 1, wherein each reference feature and that is not stored in the digital map identified in a recorded digital image is preferably buffer stored and the buffer stored reference feature is used for purposes of determining absolute position, provided that the buffer stored reference feature is identified in a subsequently recorded digital image.

11. The method in accordance with claim 1, wherein each reference feature and that is not stored in the digital map identified in a recorded digital image is preferably buffer stored and the buffer stored reference feature is used for purposes of determining absolute position, provided that the buffer stored reference feature is identified in a subsequently recorded digital image.

12. The method in accordance with claim 2, wherein each reference feature and that is not stored in the digital map identified in a recorded digital image is preferably buffer stored and the buffer stored reference feature is used for purposes of determining absolute position, provided that the buffer stored reference feature is identified in a subsequently recorded digital image.

13. The method in accordance with claim 3, wherein each reference feature and that is not stored in the digital map identified in a recorded digital image is preferably buffer stored and the buffer stored reference feature is used for purposes of determining absolute position, provided that the buffer stored reference feature is identified in a subsequently recorded digital image.

14. The method in accordance with claim 1, wherein when determining the absolute position sub-regions of the defined region that cannot be navigated/driven through, or reached, or maximum possible alterations in position within a time period are taken into account on the basis of performance data of the vehicle in combination with a movement history.

15. The method in accordance with claim 1, wherein when determining the absolute position sub-regions of the defined region that cannot be navigated/driven through, or reached, or maximum possible alterations in position within a time period are taken into account on the basis of performance data of the vehicle in combination with a movement history.

16. The method in accordance with claim 2, wherein when determining the absolute position sub-regions of the defined region that cannot be navigated/driven through, or reached, or maximum possible alterations in position within a time period are taken into account on the basis of performance data of the vehicle in combination with a movement history.

17. The method in accordance with claim 3, wherein when determining the absolute position sub-regions of the defined region that cannot be navigated/driven through, or reached, or maximum possible alterations in position within a time period are taken into account on the basis of performance data of the vehicle in combination with a movement history.

18. The method in accordance with claim 4, wherein when determining the absolute position sub-regions of the defined region that cannot be navigated/driven through, or reached, or maximum possible alterations in position within a time period are taken into account on the basis of performance data of the vehicle in combination with a movement history.

* * * * *